United States Patent
Yeh et al.

(10) Patent No.: US 8,368,993 B2
(45) Date of Patent: Feb. 5, 2013

(54) 2D/3D IMAGE SWITCHING DISPLAY DEVICE

(75) Inventors: Yu-Chou Yeh, Taoyuan County (TW); Chao-Yi Wang, Taoyuan County (TW); Tsung-Her Yeh, Taipei County (TW)

(73) Assignee: J Touch Corporation, Taoyuan County (TW)

( * ) Notice: Subject to any disclaimer, the term of this patent is extended or adjusted under 35 U.S.C. 154(b) by 145 days.

(21) Appl. No.: 12/962,843

(22) Filed: Dec. 8, 2010

(65) Prior Publication Data

US 2012/0081776 A1     Apr. 5, 2012

(30) Foreign Application Priority Data

Oct. 1, 2010    (TW) ............................... 99133588 A

(51) Int. Cl.
  *G02F 1/153*    (2006.01)
  *G02F 1/15*    (2006.01)
(52) U.S. Cl. ........................................ 359/273; 359/265
(58) Field of Classification Search .................. 359/265, 359/271, 273
  See application file for complete search history.

(56) References Cited

U.S. PATENT DOCUMENTS 8,115,985 B2 *   2/2012   Liu ................................ 359/273

FOREIGN PATENT DOCUMENTS

TW        371902 M      4/2009
TW        368088 M     11/2009

* cited by examiner

*Primary Examiner* — William Choi
(74) *Attorney, Agent, or Firm* — Rosenberg, Klein & Lee

(57) ABSTRACT

A 2D/3D image switching display device includes an image display unit and an image switching unit coupled to a surface of the image display unit, and the image switching unit includes a first substrate, a second substrate, first and second conducting elements corresponding to the first and second substrates respectively, and an electrochromic unit installed between the first and second substrates, and the electrochromic unit includes a first electrochromic layer and a second electrochromic layer combined with each other, such that when the image display unit switches its display from the display of planar images to stereo images, the electrochromic layers turn to a dark light-shading condition for a better light-shielding effect, and moire patterns will not be produced after naked eyes receive left and right eye images of a stereo image, and the display device can display stereo images directly without requiring an additional parallax barrier device.

13 Claims, 19 Drawing Sheets

2D/3D IMAGE SWITCHING DISPLAY DEVICE

CROSS-REFERENCE TO RELATED APPLICATIONS

This non-provisional application claims priority under 35 U.S.C. §119(a) on Patent Application No(s). 099133588 filed in Taiwan, R.O.C. on Oct. 1, 2010, the entire contents of which are hereby incorporated by reference.

BACKGROUND OF THE INVENTION

1. Field of the Invention

The present invention relates to a 2D/3D image switching display device, and more particularly to a 2D/3D image switching display device capable of switching a display status to the display of planar images or stereo images.

2. Description of the Related Art

The principle of present well-known stereo image display technologies adopts a binocular disparity for receiving different images from both left and right eyes of a user respectively, and finally the user's brain merges the images into a stereo (3D) image. In naked-eye stereo display technologies, there are two main types of structures, respectively: lenticular lens and barrier, and these structures have advantages and disadvantages, wherein the lenticular lens includes a plurality of slender straight convex lenses arranged continuously along an axial direction to produce different views to the left and right eyes by the principle of optical refraction. Compared with the barrier, the lenticular lens makes use of the light refraction to achieve the light division effect, so that there will be less loss of light and better brightness, but the refraction occurred at edges of the lens is restricted and the refraction effect is poor, or stray light is produced due to factors such as the manufacturing discrepancy of the lenticular lens and the difficulty of leveling a lens surface, and thus blurring a portion of a stereo image and affecting the overall display effect of the stereo image. In addition, the barrier uses a whole row of obstacles to limit the emission of lights at a certain angle and allows viewing images of a certain angle to be transmitted to the left and right eyes to produce the stereo image. Compared with the lenticular lens, the single lens image is clearer, but the congenital structural characteristic will result in drawbacks such as reducing the overall brightness and the resolution of the image.

In addition, the general stereo display device can display stereo images only, but cannot switch between planar images and stereo images, and the main reason resides on that after the lenticular lens or barrier is combined with the general display device, and all planar images passed through lenticular lens or barrier are divided into left-eye images and right-eye images, unless a stereo image display module is installed externally. If it is not necessary to display stereo images, the external stereo image display module is removed from the display device. However, the aforementioned application requires a precious alignment to avoid a reduced image resolution or a deviation. Therefore, manufacturers have developed a stereo image display device capable of switching the display between stereo images and planar images.

As disclosed in R.O.C. Pat. No. M371902 entitled "Display device for switching 2D image/3D image display screen", the display device comprises a flat panel display and a parallax barrier panel installed on a display surface of the flat panel display, wherein the parallax barrier panel includes a grid pattern having a first electrochromic material layer and a second electrochromic material layer. In 2D image display status, the grid pattern, the first electrochromic material layer and the second electrochromic material layer are transparent, and in a 3D image display status, the grid pattern is an opaque pattern, and the first electrochromic material layer has a first color, and the second electrochromic material layer has a second color.

As disclosed in R.O.C. Pat. No. M368088 entitled "Integrated electrochromic 2D/3D display device", the display device comprises: a first substrate; a parallax barrier unit installed under a first substrate; a color filter unit installed under the parallax barrier unit; a common electrode disposed under the color filter unit; a liquid crystal unit installed under the common electrode; a plurality of thin film transistors installed under the liquid crystal unit; a second substrate disposed under plurality of liquid crystal units; and a light source installed under the second substrate, wherein the parallax barrier unit modulates planar images and stereo images to reduce the thickness and assembling cost of the conventional display device.

The aforementioned two patented technologies adopt parallax barrier devices with an electrochromic material to display stereo images, but both structures have a common drawback of lacking a necessary electrolyte layer of the electrochromic device, since ions are not supplied to the electrolyte layer of the electrochromic layer, and the electrochromic device cannot produce a reversible oxidation or reduction to complete the change of coloration or decoloration, or the coloration/decoloration speed is very slow, so that the aforementioned patent technologies are not feasible in practical applications. In addition, the transparent electrode layer and the electrochromic material layer of the parallax barrier device are grid patterned, and whose manufacturing process requires a precise alignment to achieve the effect of coating, spluttering or etching each laminated layer, and thus the manufacturing process becomes very complicated. In addition, all laminated layers are grid patterned, so that a hollow area is formed between one grid and the other, and the overall penetration, refraction and reflection of the light will be affected. Even for the general 2D display, the video display quality of the display device will be affected adversely to cause problems related to color difference and uneven brightness. In another structure embedded with a liquid crystal display substrate in accordance with the R.O.C. Pat. No. M368088 is installed on an insulating transparent material by a grid pattern method. Although this patented technology can reduce the thickness of a stereo image liquid crystal display, yet the actual manufacturing procedure is also very complicated. Furthermore, the aforementioned prior arts come with a multilayer laminated structure, and thus the overall brightness and quality of the 3D images will be affected adversely for both 2D and 3D image displays.

SUMMARY OF THE INVENTION

In view of the shortcomings of the prior art, the inventor of the present invention based on years of experience in the related industry to conduct extensive researches and experiments, and finally developed a 2D/3D image switching display device in accordance with the present invention to overcome the shortcomings of the prior art.

Therefore, it is a primary objective of the present invention to provide a 2D/3D image switching display device capable of switching to a planar image or stereo image display status.

Another objective of the present invention is to provide a 2D/3D image switching display device for the display of 2D/3D images without requiring the installation of any parallax barrier device.

Another objective of the present invention is to provide a 2D/3D image switching display device that will not affect the resolution of stereo images when planar images are displayed.

Another objective of the present invention is to provide a 2D/3D image switching display device that can simplify the manufacturing procedure.

Another objective of the present invention is to provide a 2D/3D image switching display device that can reduce the thickness and enhance the light transmittance.

To achieve the foregoing objectives, the present invention provides a 2D/3D image switching display device, comprising: an image display unit, for displaying a planar image and a stereo image; an image switching unit, coupled to a surface of the image display unit, and including: a first substrate, having a first conducting element disposed on a surface of the first substrate; a second substrate, having a second conducting element disposed on a surface of the second substrate and corresponding to the first conducting element and another surface of the second substrate being provided for coupling with the image display unit surface; and an electrochromic unit, installed between the first conducting element and the second conducting element, and having a first electrochromic layer and a second electrochromic layer disposed with an interval apart from each other alternately, so that the electrochromic layers produce a color change according to the electric conduction of the conducting elements. Compared with the multilayer laminated structure, the other structure of the present invention including the first and second electrochromic layers arranged horizontally adjacent to each other can reduce the overall thickness and enhance the light output rate effectively.

Therefore, the image display unit is switched from the status of displaying a planar image to the status of displaying a stereo image, and the displayed stereo image is divided into a left-eye stereo image and a right-eye stereo image. Now, the conducting elements are electrically conducted, such that the color of the electrochromic layers is changed from a transparent area into a dark light shield area according to the arrangement of the electrochromic units with an interval apart from each other to divide the stereo image received by the left and right eyes of a viewer. After a portion of an overlapped area of the stereo image is eliminated from the light shield areas, a Moire pattern will not be produced. In general, two types of devices including the lenticular lens and the barrier are added to the display unit for displaying stereo images. When the 2D/3D image switching display device of the present invention displays a stereo image, the display unit directly divides the stereo image into an image received by the left eye and an image received by the right eye, and the vision merges these two images into a stereo image.

DETAILED DESCRIPTION OF THE PREFERRED EMBODIMENTS

Figure 1:
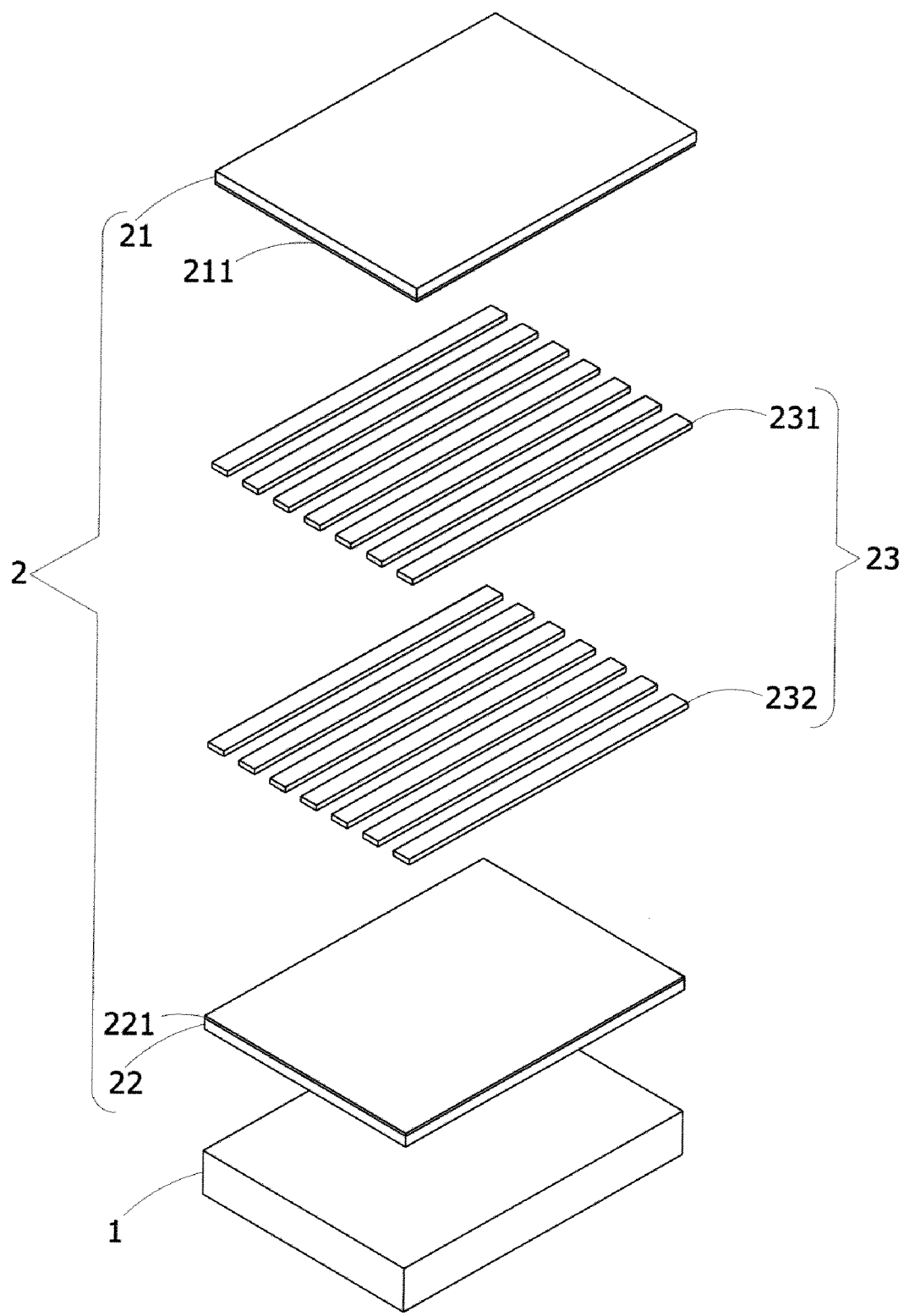
FIG. 1 is an exploded view of a first preferred embodiment of the present invention.
Figure 2:
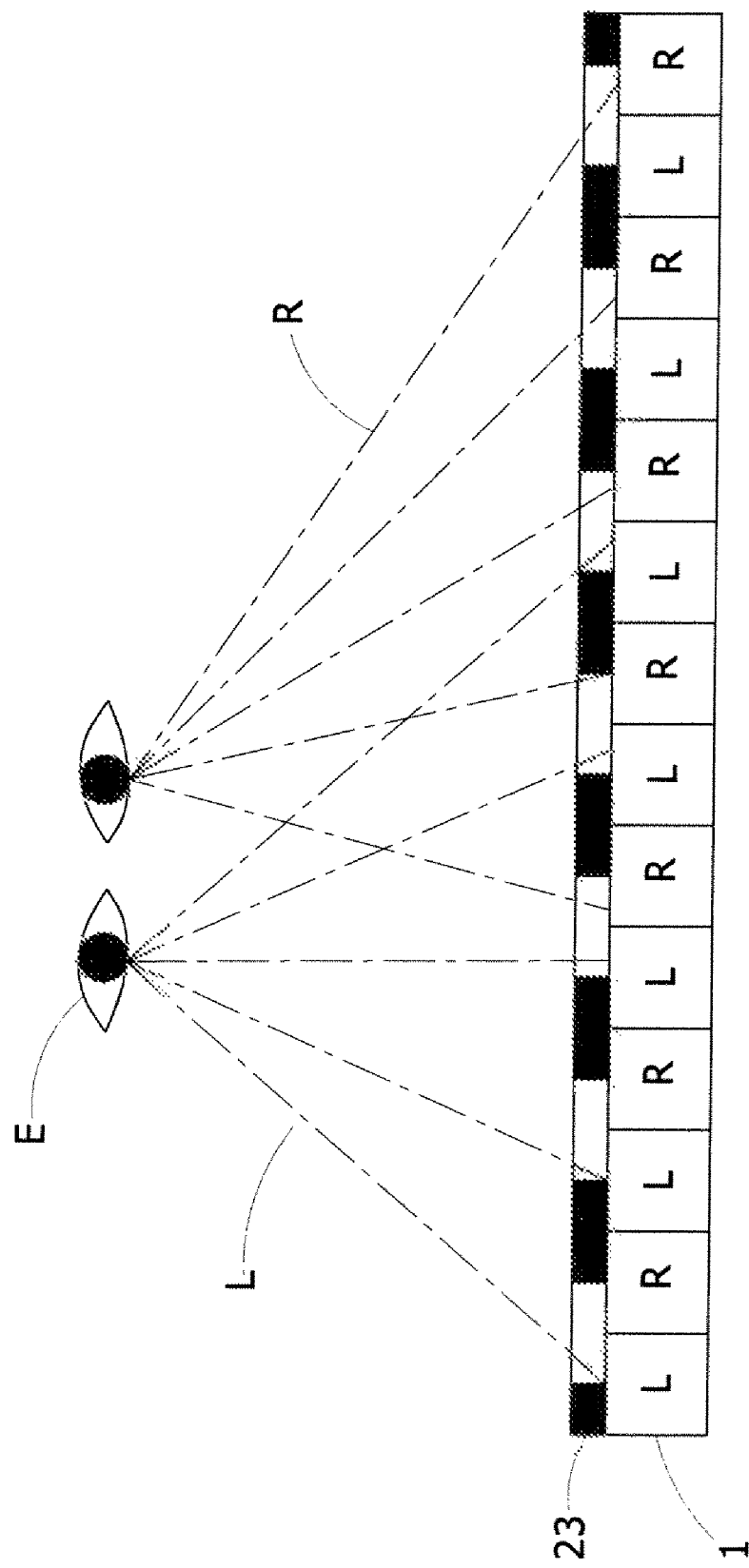
FIG. 2 is a first schematic view, showing an operation of a first preferred embodiment of the present invention.

The technical contents of the present invention will be apparent with the detailed description of preferred embodiment together with the illustration of related drawings as follows.

With reference to FIGS. 1 to 4 for an exploded view and schematic views of a 2D/3D image switching display device in accordance with a first preferred embodiment of the present invention respectively, the 2D/3D image switching display device comprises an image display unit 1 and an image switching unit 2.

In the image display unit 1 for displaying a planar image and a stereo image, the stereo image can be generated by a software, firmware or hardware technology. For example, a planar image is converted into an overlapped stereo image including a left-eye stereo image and a right-eye stereo image by software or firmware, or the stereo image is divided into the left-eye stereo image and the right-eye stereo image by two types of hardware devices such as a lenticular lens or a barrier, but this type of stereo image display technology is a prior art and not a technical characteristic of the present invention, and thus will not be described here. It is noteworthy to point out that the display unit 1 can be one selected from the collection of a liquid crystal display (LCD), a plasma display panel (PDP), a surface conduction electron-emitter display (SED), a field emission display (FED), a vacuum fluorescent display (VFD), an organic light-emitting diode (OLED) and an E-paper.

The image switching unit 2 is coupled to a surface of the image display unit 1 and comprises a first substrate 21, a second substrate 22, and an electrochromic unit 23.

Figure 5:
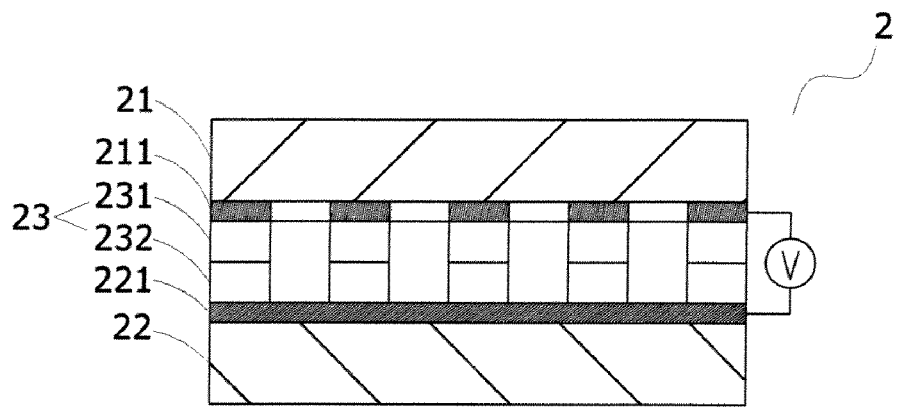
FIG. 5 is a first schematic view, showing a combination of different layers in accordance with a first preferred embodiment of the present invention.
Figure 6:
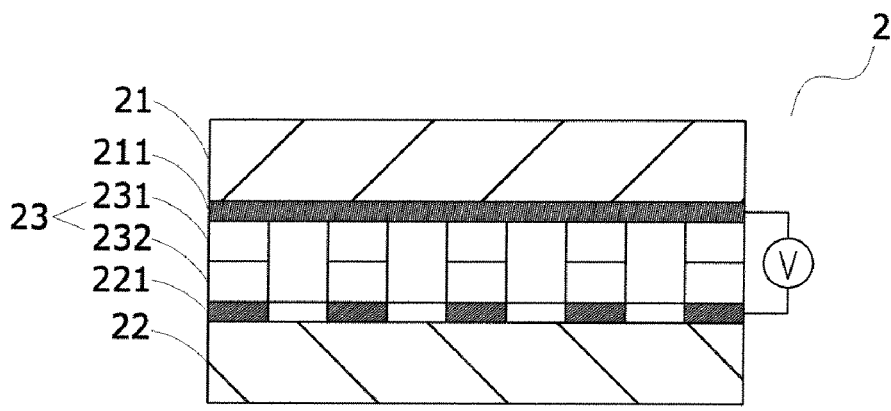
FIG. 6 is a second schematic view, showing the combination of different layers in accordance with a first preferred embodiment of the present invention.
Figure 7:
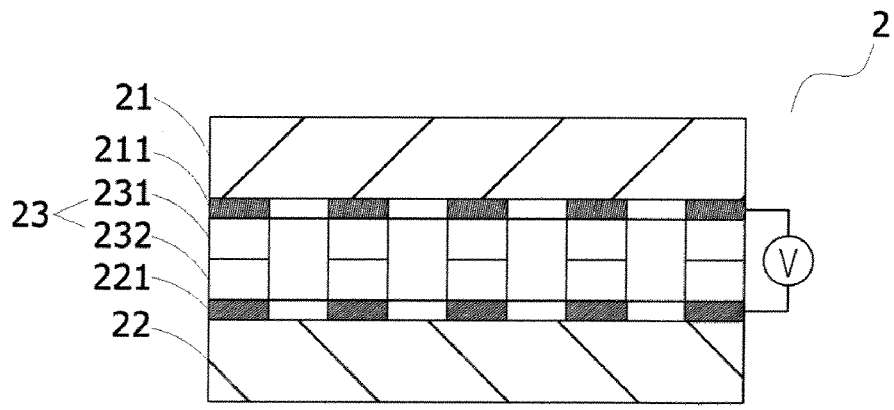
FIG. 7 is a third schematic view, showing the combination of different layers in accordance with a first preferred embodiment of the present invention.

The first substrate 21 includes a first conducting element 211 disposed on a lower surface of the first substrate 21, and the second substrate 21 includes a second conducting element 221 disposed on an upper surface of the second substrate 21, and the first conducting element 211 and the second conducting element 221 are sheets or surfaces completely covered onto the substrates 21, 22. Besides the shape of the sheet, one or both of the conducting elements 211, 221 are grids installed with an interval apart from one another (as shown in FIGS. 5 to 7). In addition, the first substrate 21 and the second substrate 22 are made of glass or a plastic polymer selected from the collection of resin, polyethylene terephthalate (PET), polycarbonate (PC), polyethylene (PE), polyvinyl chloride (PVC), polypropylene (PP), polystyrene (PS) and polymethylmethacrylate (PMMA), or a mixture of the above. The first conducting element 211 and the second conducting element 221 are made of an impurity-doped oxide selected from the collection of indium tin oxide (ITO), indium zinc oxide (IZO), Al-doped ZnO (AZO) and antimony tin oxide (ATO) or a carbon nanotube.

The electrochromic unit 23 includes a first electrochromic layer 231 and a second electrochromic layer 232, and the first electrochromic layer 231 is stacked vertically onto the top of the second electrochromic layer 232, and the first electrochromic layer 231 and the second electrochromic layer 232 can be formed horizontally adjacent with an interval apart from each other. The electrochromic unit 23 is installed between the conducting elements 211, 221 by a sol-gel, sputtering, plating, screen printing, coating, anodizing, photopolymerization, or laser etching method. The electrochromic layers 231, 232 are made of an anodic coloration, cathodic coloration or cathodic/anodic coloration transition metal oxide or any other organic compound. It is noteworthy to point out that the electrochromic layers 231, 232 have the supplement property of color change. If the first electrochromic layer 231 is made of an anodic coloration material, and the second electrochromic layer 232 is made of a cathodic coloration material, or vice versa, or both are made of a cathodic/anodic coloration material, the anodic coloration material is an anodic coloration transition metal oxide selected from the collection of chromium oxide ($Cr_2O_3$), nickel oxide ($NiO_x$), iridium oxide ($IrO_2$), manganese oxide ($MnO_2$), ferric ferrocyanide $Fe_4[Fe(CN)_6]_3$ and nickel hydroxide $Ni(OH)_2$; the cathodic coloration material is a cathodic/anodic coloration transition metal oxide selected from the collection of tungsten oxide ($WO_3$), molybdenum oxide ($MoO_3$), niobium oxide ($Nb_2O_3$), titanium oxide ($TiO_2$), and strontium titanium oxide ($SrTiO_3$); and the cathodic/anodic coloration material is one selected from the collection of vanadium pentoxide ($V_2O_5$), rhodium oxide ($Rh_2O_3$) and cobalt oxide ($CoO_x$). In addition, the transition metal oxide such as tantalum pentoxide ($Ta_2O_5$) can also be used as a solid-state electrolyte and an ion conductor layer.

Some of the common transition oxides classified as electrochromic materials are listed in the following table:

|  | Transition Metal Oxide | Oxidized State | Reduced State |
|---|---|---|---|
| Reduced State Coloration (cathodic coloration) | $WO_3$ | Transparent | Blue |
|  | $MoO_3$ | Transparent | Blue |
|  | $Nb_2O_3$ | Transparent | Blue |
|  | $TiO_2$ | Transparent | Dark blue/dark green |
|  | NiOx | Dark bronze | Transparent |
| Oxidized State Coloration (anodic coloration) | $IrO_2$ | Black | Transparent |
|  | $Ni(OH)_2$ | Brown | Transparent light Yellow |
|  | $Fe[Fe(CN)_6]_3$ | Dark blue | Transparent |
| Oxidized/Reduced State Coloration (cathodic/anodic coloration) | $V_2O_5$ | Grey | Yellow |
|  | $CoO_x$ | Red | Blue |
|  | $Rh_2O_3$ | Yellow | Green |

An electric potential is applied to the electrochromic materials of this sort to produce a reversible oxidation or reduction and result in a color change. If a bias voltage is applied to the first electrochromic layer 231 and the second electrochromic layer 232 of the electrochromic unit 23, ions previously stored in the second electrochromic layer 232 will be dispersed and moved to the first electrochromic layer 231, while electrons will be passed through the first conducting element 221 and introduced into the first electrochromic layer 231 to maintain the electrical neutrality of the electrochromic layers. After the electrons and ions are introduced into the electrochromic layers 231, 232 to change the oxidation/reduction state of the material of the electrochromic unit 23, the refractive index and transmittance of the electrochromic unit 23 will be changed for a coloration process, and the process can be completed within a few seconds to a minute.

Figure 3:
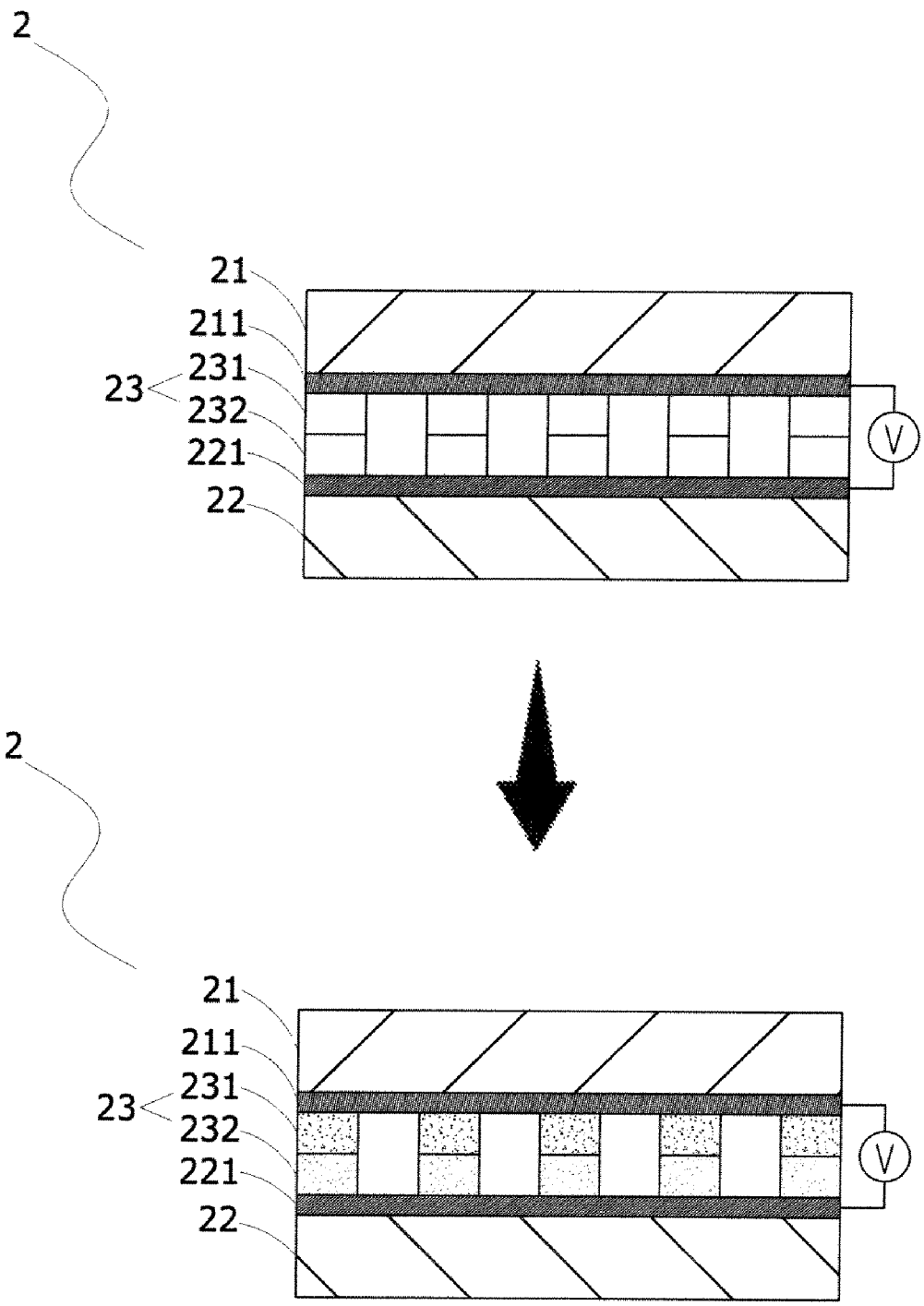
FIG. 3 is a second schematic view, showing the operation of a first preferred embodiment of the present invention.
Figure 4:
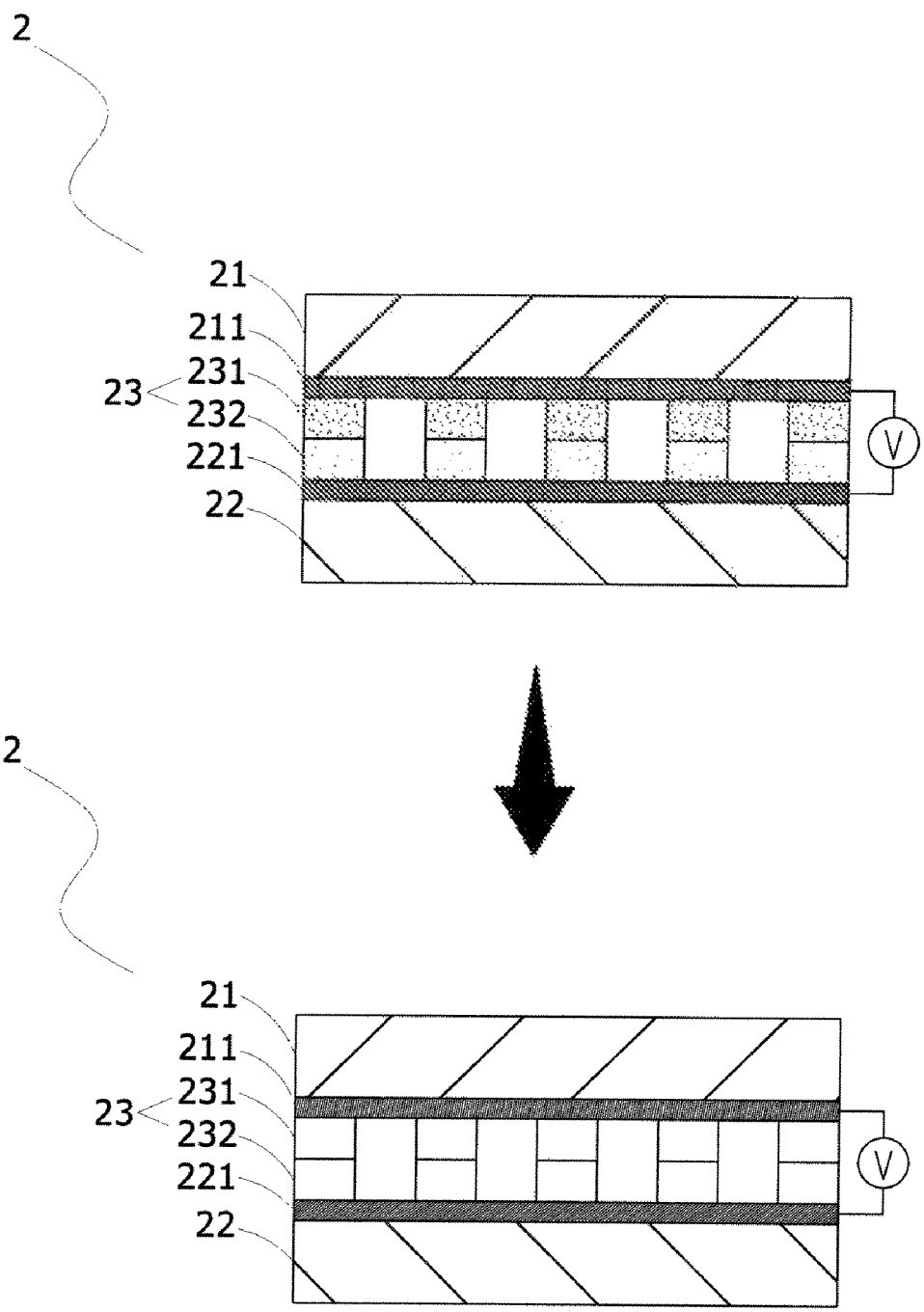
FIG. 4 is a third schematic view, showing the operation of a first preferred embodiment of the present invention.

With reference to FIG. 3 at the same time, the electrochromic unit 23 is changed from the transparent state to the colored state to form an opaque light shield area. After the bias voltage applied to the electrochromic unit 23 disappears, the electrochromic unit 23 is changed from the colored state back to the transparent state. If a reverse voltage or a zero-bias voltage is applied to the electrochromic unit 23, the ions will return in an opposite path from the first electrochromic layer 231 to the second electrochromic layer 232, and thus the electrochromic unit 23 resumes its colorless state for a decoloration process, and this is called an anodic coloration method.

With reference to FIG. 4 again, the electrochromic unit 23 changes the dark light shield area from a colored state to a transparent state. After the bias voltage applied to the electrochromic unit 23 disappears, the electrochromic unit 23 is changed from the transparent state to the colored state to resume its dark light shield area, and this is called a cathodic coloration method.

After the first conducting element 211 and the second conducting element 221 of the present invention are electrically conducted to produce a color change of the electrochromic units 23 and a plurality of dark light shield areas arranged with an interval from one another. The plurality of stereo images (each being divided into a left-eye stereo image L and a right-eye stereo image R) is processed and displayed by the image display unit 1, a portion of the overlapped stereo image area is eliminated from the light shield areas, so that when naked eyes receive the images, no Moire pattern will be produced, and a stereo image received by the left eye and the right eye can be distinguished and combined to produce the stereo image.

With reference to FIGS. 5 to 7 for schematic views showing a combination of different layers in accordance with a first preferred embodiment of the present invention, the first conducting elements 211 are in form of a plurality of grids arranged with an interval apart from each other and disposed on a lower surface of the first substrate 21, or the second conducting elements 221 are in form of a plurality of grids arranged with an interval apart from each other and disposed on an upper surface of the second substrate 22, or the first and second conducting elements 211, 221 are in form of a plurality of grids arranged with an interval apart from each other and disposed on surfaces of the first and second substrates 21, 22 respectively, and their arrangement direction is the same as the arrangement direction of the electrochromic layers 231, 232, and the first and second conducting elements 211, 221 are stacked on top of one another. The structures are modifications of the first preferred embodiment, and the electrochromic layers 231, 232 arranged with an interval apart in a layered structure comes with a simplified manufacturing procedure and provides good color changing mechanism and shielding effect.

Figure 8:
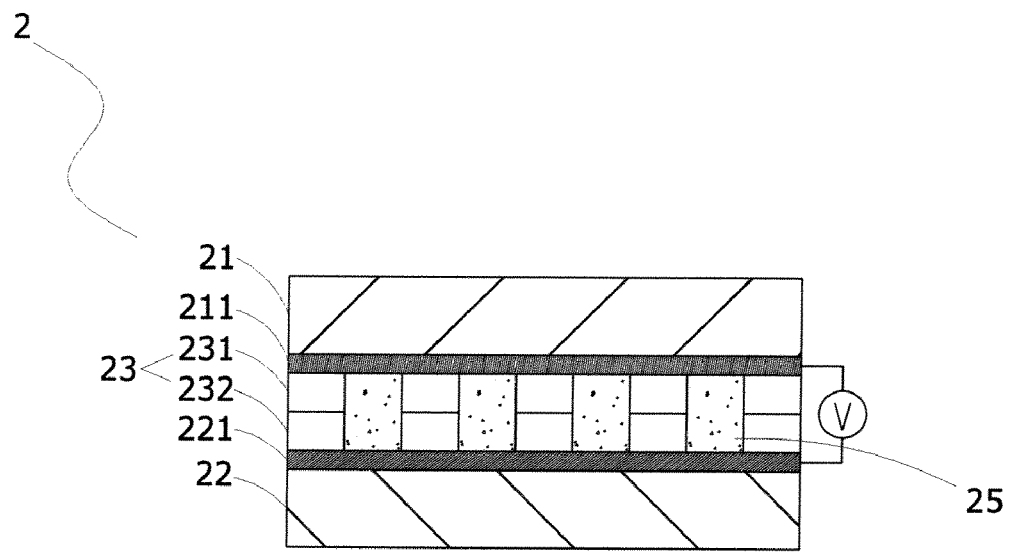
FIG. 8 is a first schematic view, showing a combination of different layers in accordance with a second preferred embodiment of the present invention.
Figure 9:
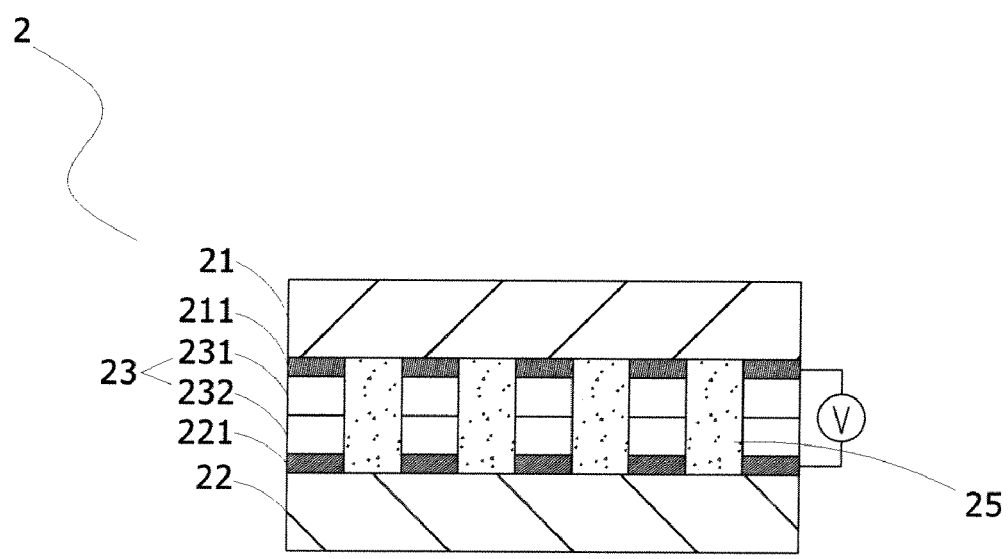
FIG. 9 is a second schematic view, showing the combination of different layers in accordance with a second preferred embodiment of the present invention.

With reference to FIGS. 8 and 9 for schematic views of a combination of different layers in accordance with a second preferred embodiment of the present invention, the difference of this preferred embodiment from the first preferred embodiment resides on that a plurality of isolating units 25 is formed between layers of the electrochromic layers 231, 232 and provided for enhancing the strength and using life of the electrochromic layers 231, 232, wherein the isolating unit is selected from a photoresist.

Figure 10:
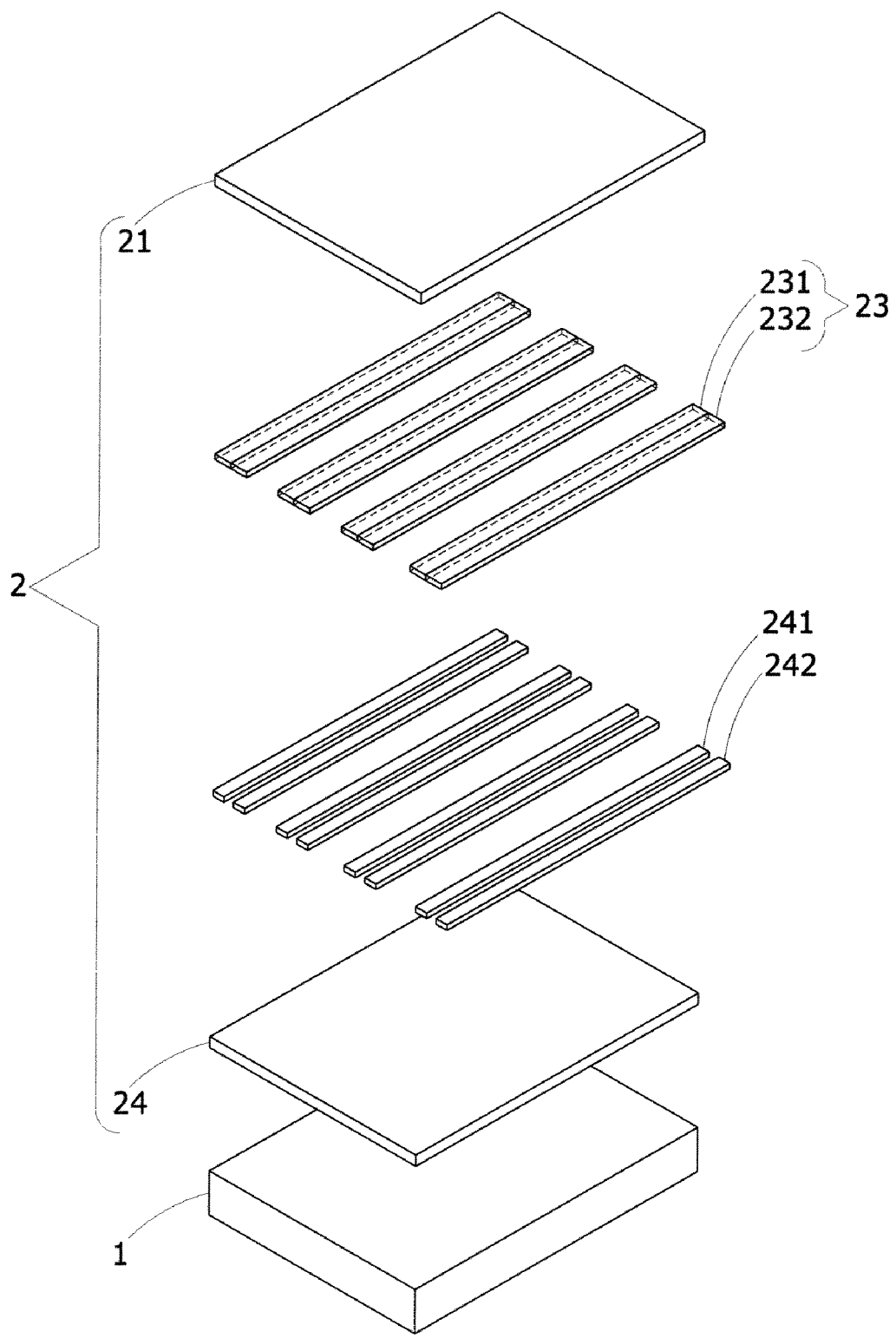
FIG. 10 is an exploded view of a third preferred embodiment of the present invention.
Figure 11:
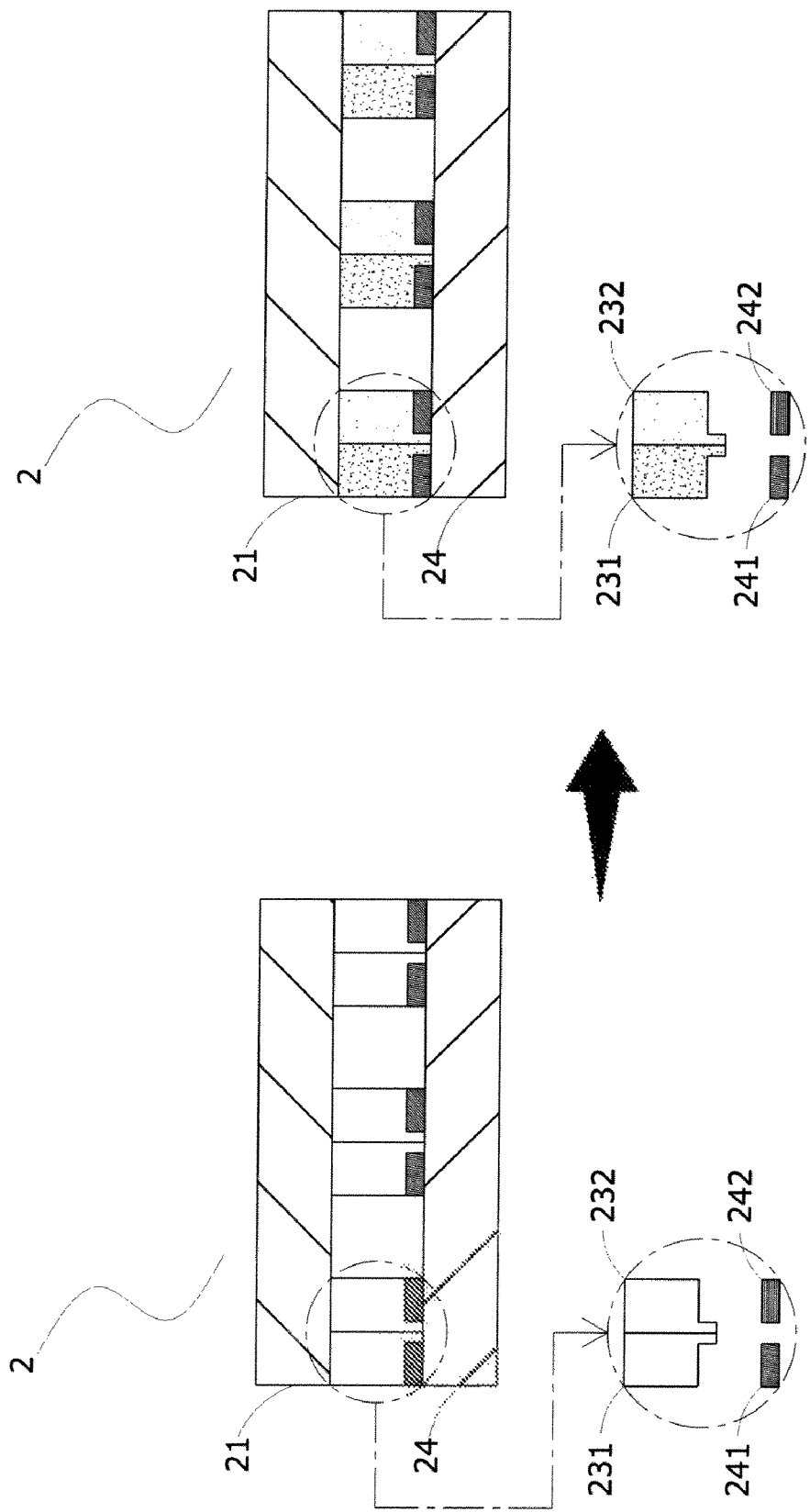
FIG. 11 is a first schematic view, showing an operation of a third preferred embodiment of the present invention.
Figure 12:
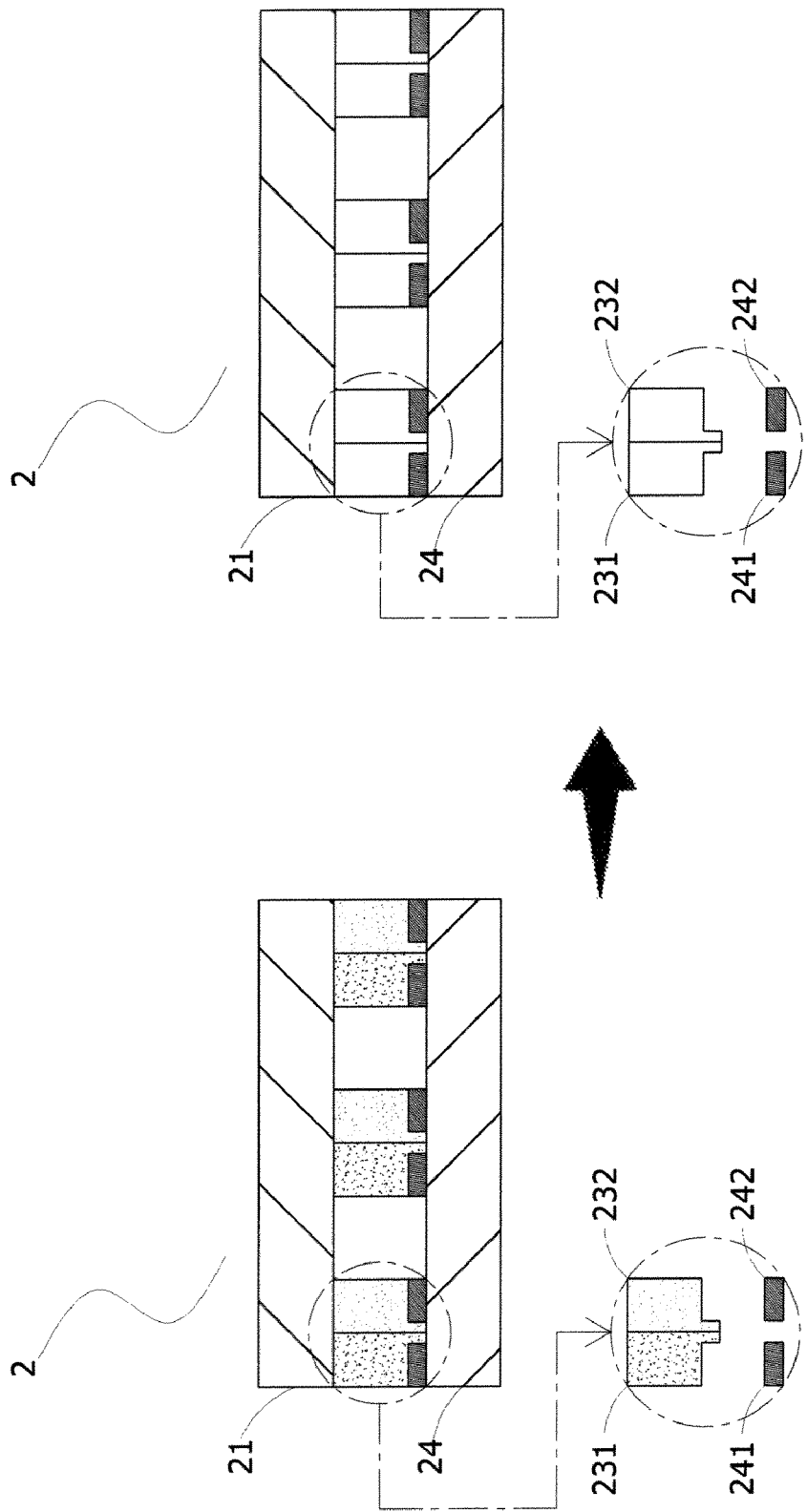
FIG. 12 is a second schematic view, showing the operation of a third preferred embodiment of the present invention.

With reference to FIGS. 10 to 12 for an exploded view and schematic views of a combination of different layers in accordance with a third preferred embodiment of the present invention respectively, the difference of the third preferred embodiment of the present invention from the first preferred embodiment resides on that the image switching unit 2 includes the first substrate 21 and a third substrate 24, and the third substrate 24 includes a third conducting element 241 and a fourth conducting element 242 arranged with an interval apart from each other and corresponding to the surface of the first substrate 21, and the other surface is provided for coupling with a surface of the image display unit 1.

The electrochromic unit 23 of the image switching unit 2 is disposed between the conducting elements 241, 242, and the first electrochromic layers 231 and the second electrochromic layers 232 are arranged alternately with an interval apart from each other, and a side of the first electrochromic layer 231 is coupled to the third conducting element 241, and a side of the second electrochromic layer 232 is coupled to the fourth conducting element 242. Therefore, the first electrochromic layers 231 and the second electrochromic layer 232 are arranged horizontally adjacent to each other, so as to reduce the overall thickness and improve the light output rate effectively. The first electrochromic layer 231 is selectively made of a cathodic coloration material, and the second electrochromic layer 232 is selectively made of an anodic coloration material, or vice versa. If the first electrochromic layer 231 is colored, the second electrochromic layer 232 will be colored, and if the first electrochromic layer 231 is decolored, the second electrochromic layer 232 will be decolored.

Figure 13:
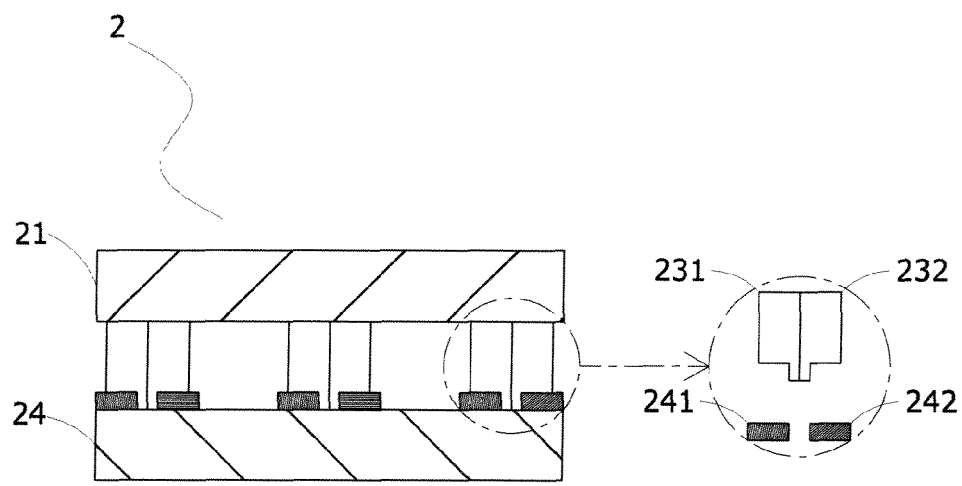
FIG. 13 is a first schematic view, showing a combination of different layers in accordance with a third preferred embodiment of the present invention.
Figure 14:
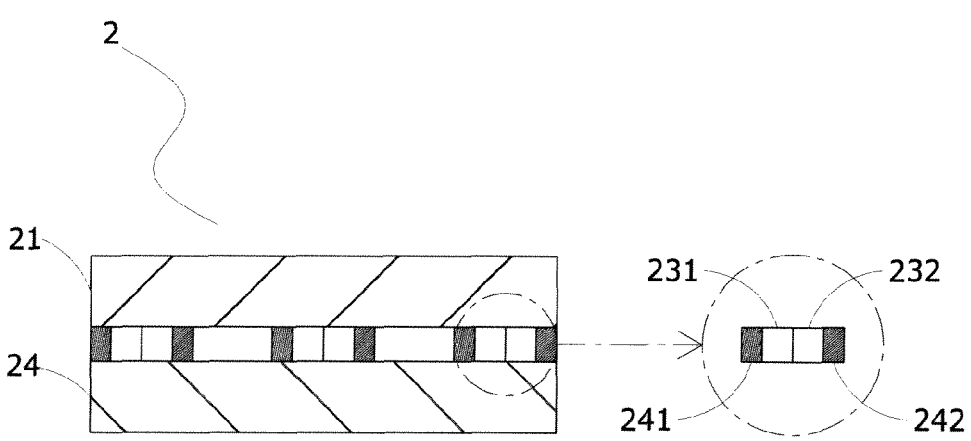
FIG. 14 is a second schematic view, showing the combination of different layers in accordance with a third preferred embodiment of the present invention.

With reference to FIGS. 13 and 14 for schematic views of a combination of different layers in accordance with a third preferred embodiment of the present invention, the first electrochromic layer 231 and the second electrochromic layer 232 are combined with each other on the same side, and the other side has a length equal to or smaller than the conducting elements 241, 242, and the right side of the first electrochromic layer 231 is coupled to the left side of the second electrochromic layer 232, and the extended length is equal to or smaller than the length of the third conducting element 241. In FIG. 13, the left side of the first electrochromic layer 231 is extended to a length smaller than the length of the third conducting element 241. It is noteworthy to point out that the left and the right sides mentioned above are provided for illustrating the change of length only, but not intended for limiting the left and right installation of the components.

In addition, the first electrochromic layer 231 and the second electrochromic layer 232 are formed between the conducting elements 241, 242 directly. In other words, the conventional way of stacking the layers is changed to a horizontal arrangement of the layer side by side, and thus the invention can reduce the thickness greatly and improve the light output rate effectively. Compared with the aforementioned preferred embodiments, this preferred embodiment can further reduce the thickness.

Figure 15:
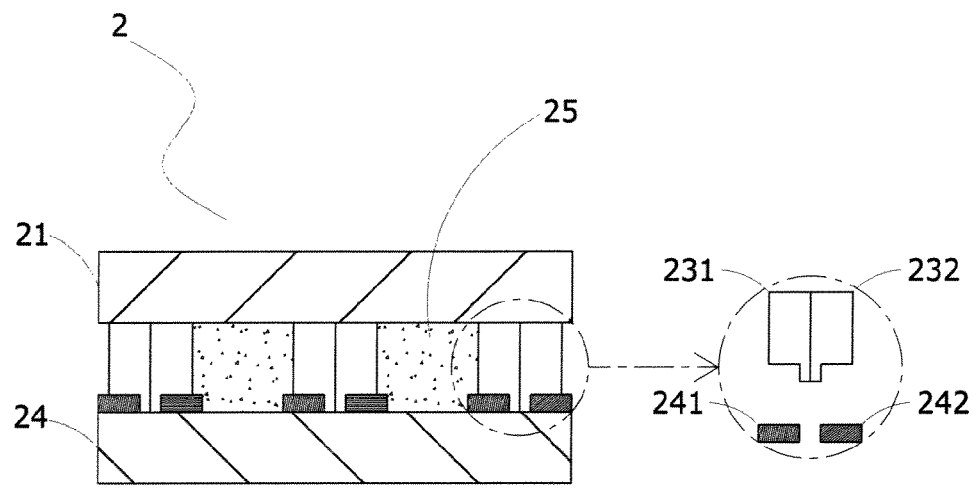
FIG. 15 is a first schematic view, showing a combination of different layers in accordance with a fourth preferred embodiment of the present invention.
Figure 16:
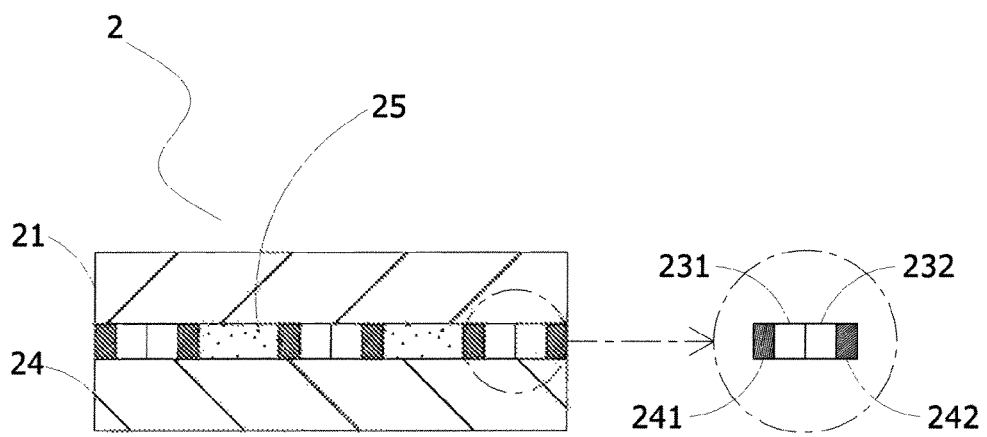
FIG. 16 is a second schematic view, showing the combination of different layers in accordance with a fourth preferred embodiment of the present invention.

With reference to FIGS. 15 and 16 for schematic views showing a combination of different layers in accordance with a fourth preferred embodiment of the present invention, the difference of this preferred embodiment from the third preferred embodiment resides on that each of the electrochromic layers 231, 232 further includes a plurality of isolating units 25 provided for enhancing the strength and using life of the electrochromic layers, wherein the isolating units 25 are photoresists.

Figure 17:
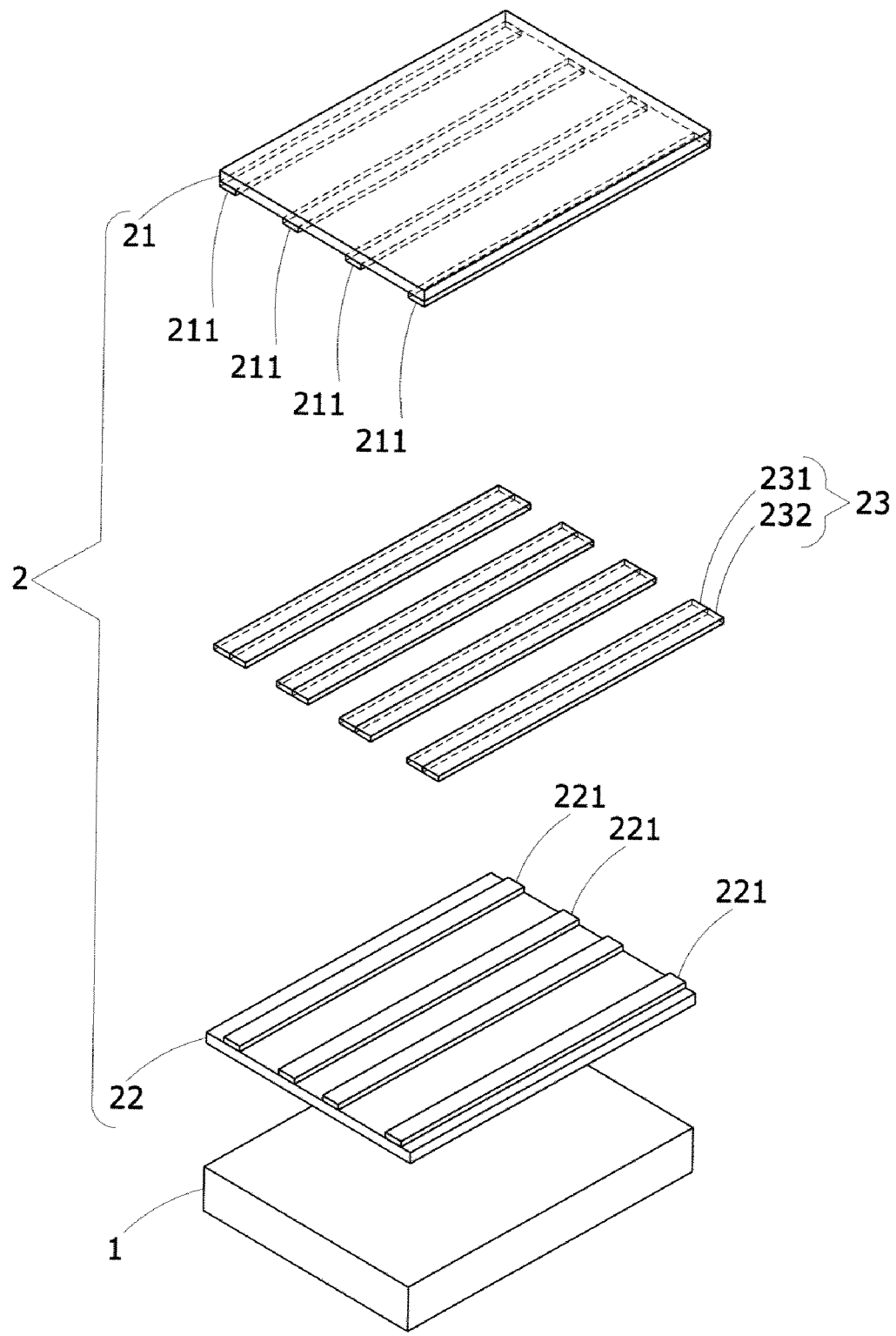
FIG. 17 is an exploded view of a fifth preferred embodiment of the present invention.
Figure 18:
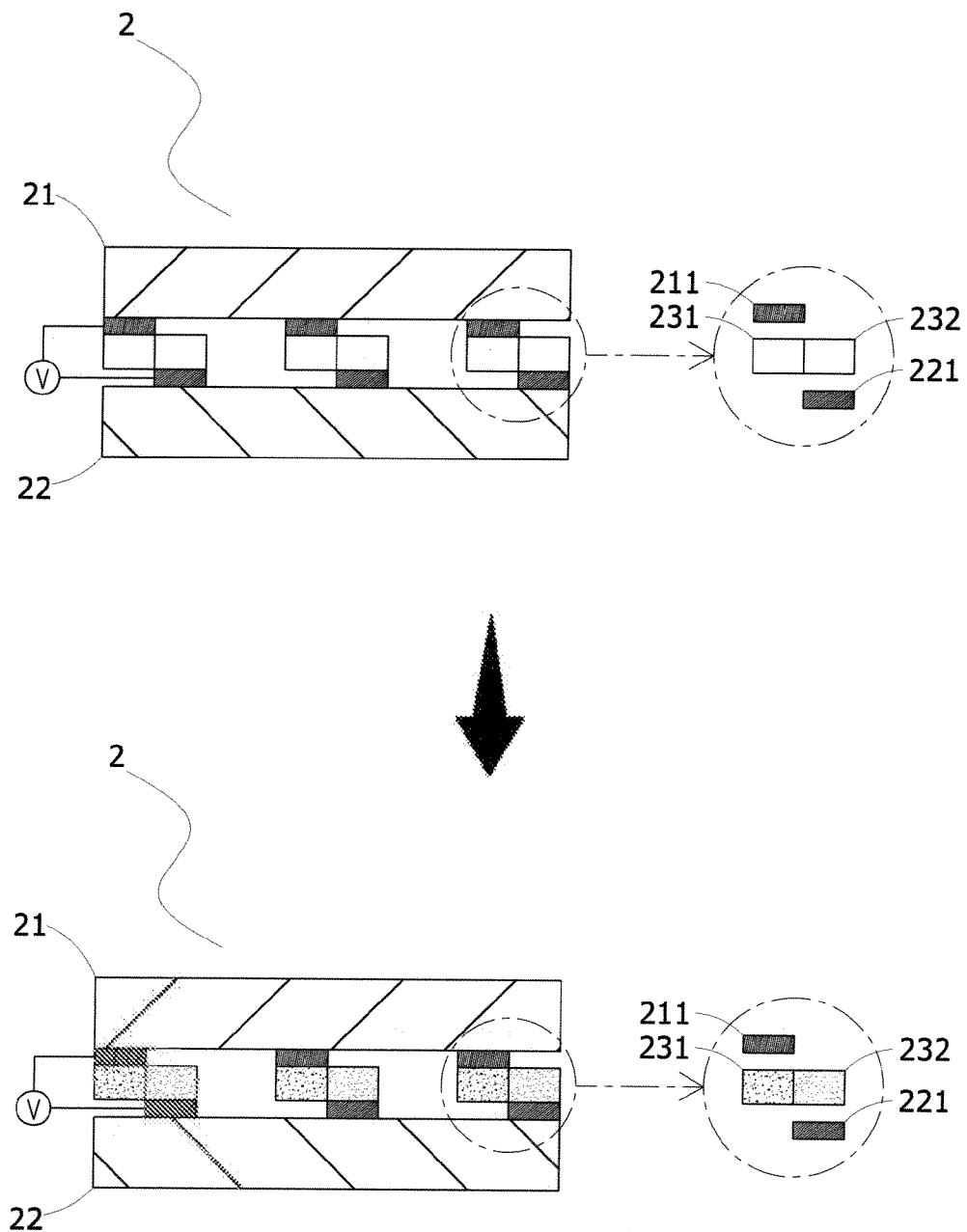
FIG. 18 is a first schematic view, showing an operation of a fifth preferred embodiment of the present invention.
Figure 19:
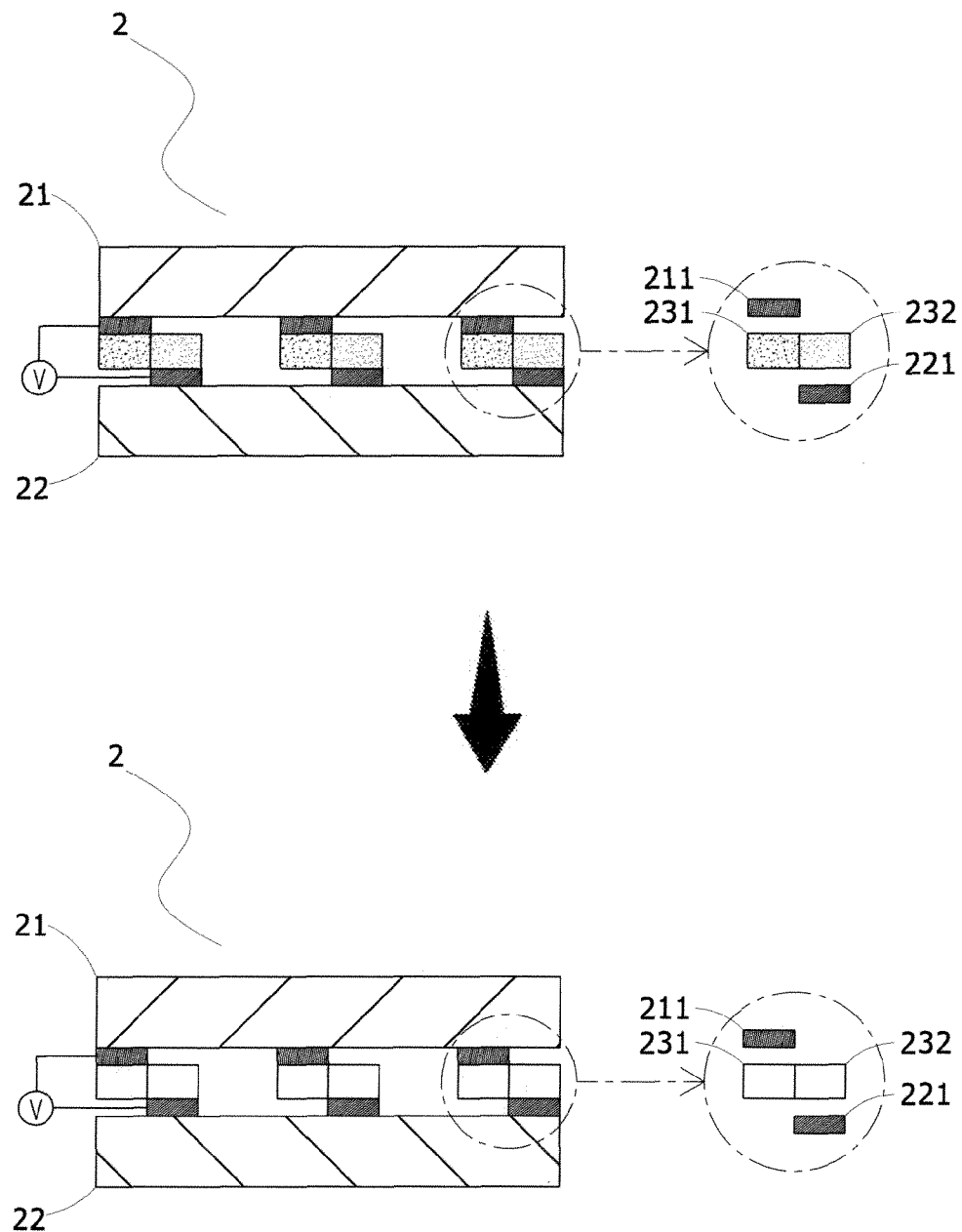
FIG. 19 is a second schematic view, showing the operation of a fifth preferred embodiment of the present invention.

With reference to FIGS. 17 to 19 for an exploded view and schematic views of a fifth preferred embodiment of the present invention respectively, the difference of this preferred embodiment from the foregoing preferred embodiments resides on that the plurality of first conducting elements 211 is formed on the lower surface of the first substrate 21 and arranged with an interval apart from each other, and the plurality of second conducting elements 221 is formed on the upper surface of the second substrate 22 and arranged with an interval apart from each other, and the first conducting elements 211 and the second conducting elements 221 are installed alternately with an interval apart from each other.

The electrochromic units 23 are alternately installed between the conducting elements 241, 242, and the first electrochromic layer 231 and the second electrochromic layer 232 are coupled, such that a side or an upper surface of the first electrochromic layer 231 is coupled to the first conducting element 211, and a side or a lower surface of the second electrochromic layer 232 is coupled to the second conducting element 221. Therefore, the first electrochromic layer 231 and the second electrochromic layer 232 of the electrochromic unit 23 are disposed horizontally adjacent to each other to reduce the overall thickness and improve the light output rate effectively, and the first electrochromic layers 231 are selectively made of a cathodic coloration material, and the second electrochromic layers 232 is selectively made of an anodic coloration material, or vice versa. If the first electrochromic layers 231 are colored, the second electrochromic layers 232 will be colored as well. If the first electrochromic layer 231 is decolored, the second electrochromic layer 232 will be decolored.

In FIG. 18, the electrochromic layers 231, 232 are changed from a transparent state to a colored state to form a dark light shield area. After the bias voltage applied to the electrochromic layers 231, 232 disappears, the electrochromic layers 231, 232 are changed from the colored state back to the transparent state, and this is called the anodic coloration method. In FIG. 19, the electrochromic layers 231, 232 change the dark light shield area from the colored state to the transparent state. After the bias voltage applied to the electrochromic layers 231, 232 disappears, the electrochromic layers 231, 232 are changed from the transparent state to the colored state to resume the dark light shield area, and this is called the cathodic coloration method.

Figure 20:
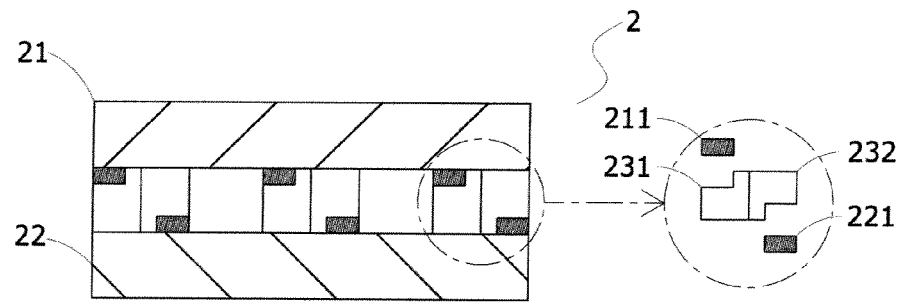
FIG. 20 is a third schematic view, showing the operation of a fifth preferred embodiment of the present invention.
Figure 21:
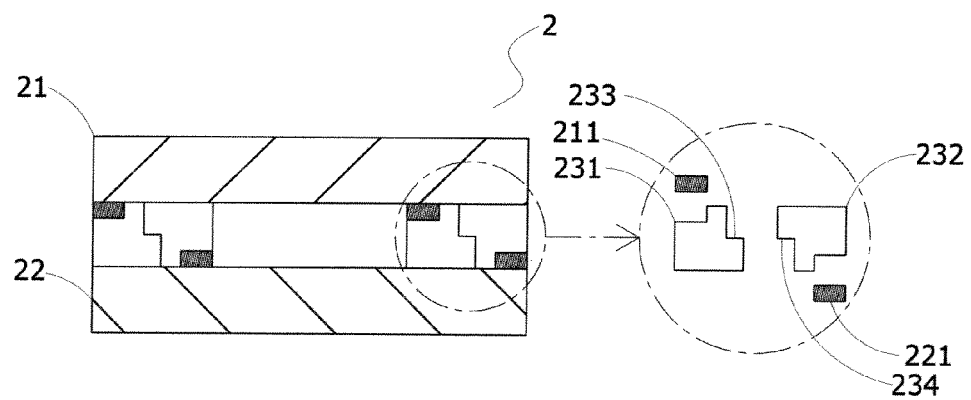
FIG. 21 is a fourth schematic view, showing the operation of a fifth preferred embodiment of the present invention.

With reference to FIG. 20 for another changing mode in accordance with a fifth preferred embodiment of the present invention, the conducting elements 211, 221 are embedded into the electrochromic layers 231, 232 respectively. To increase the contact area of the electrochromic layers 231, 232 when they are combined, an extension 233, 234 is formed separately on surfaces of the first electrochromic layer 231 and the second electrochromic layer 232 as shown in FIG. 21, such that the extensions 233, 234 can provide more contact areas for the first electrochromic layer 231 and the second electrochromic layer 232 when they are combined, so as to increase the electrochromic speed.

Figure 22:
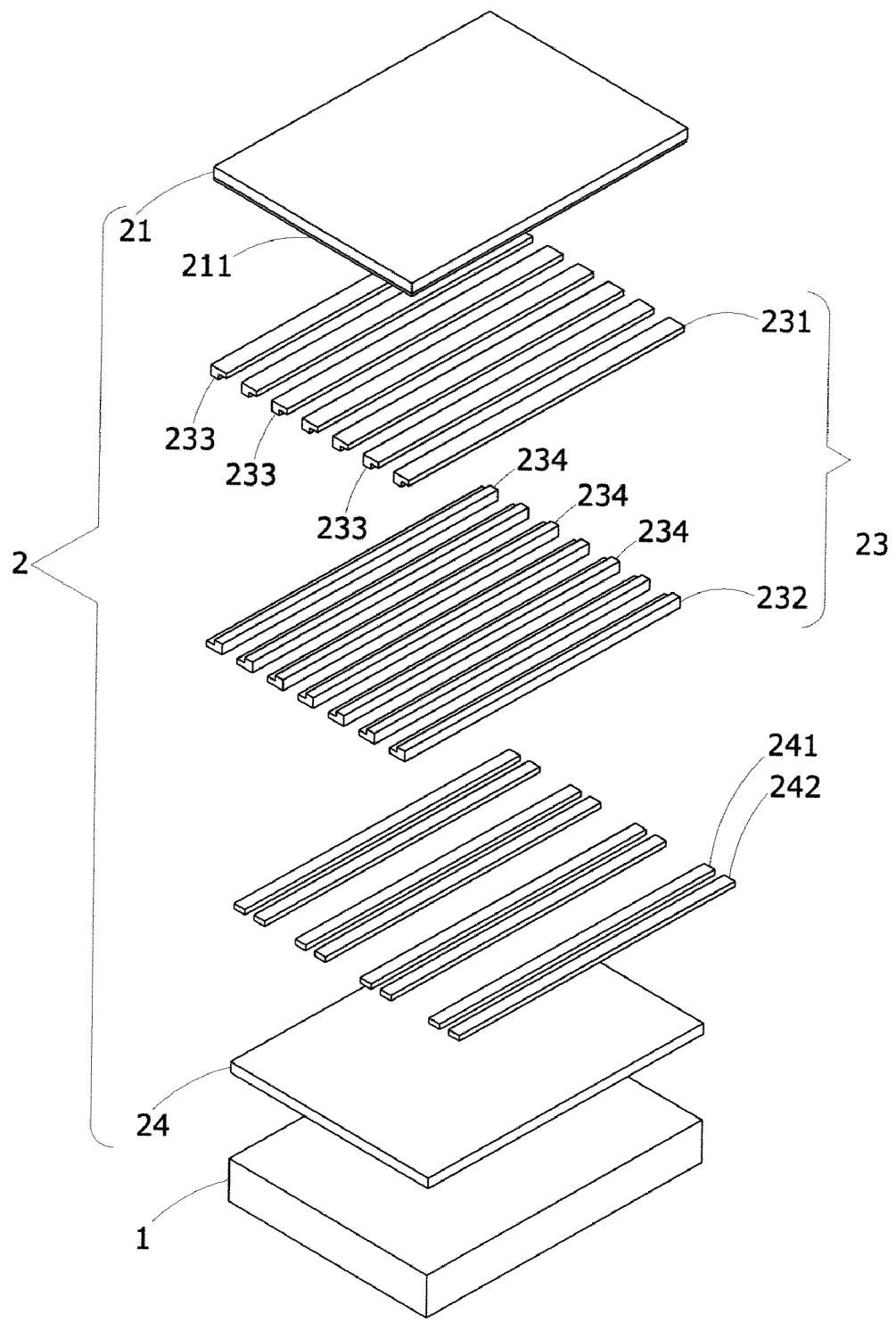
FIG. 22 is an exploded view of a sixth preferred embodiment of the present invention.
Figure 23:
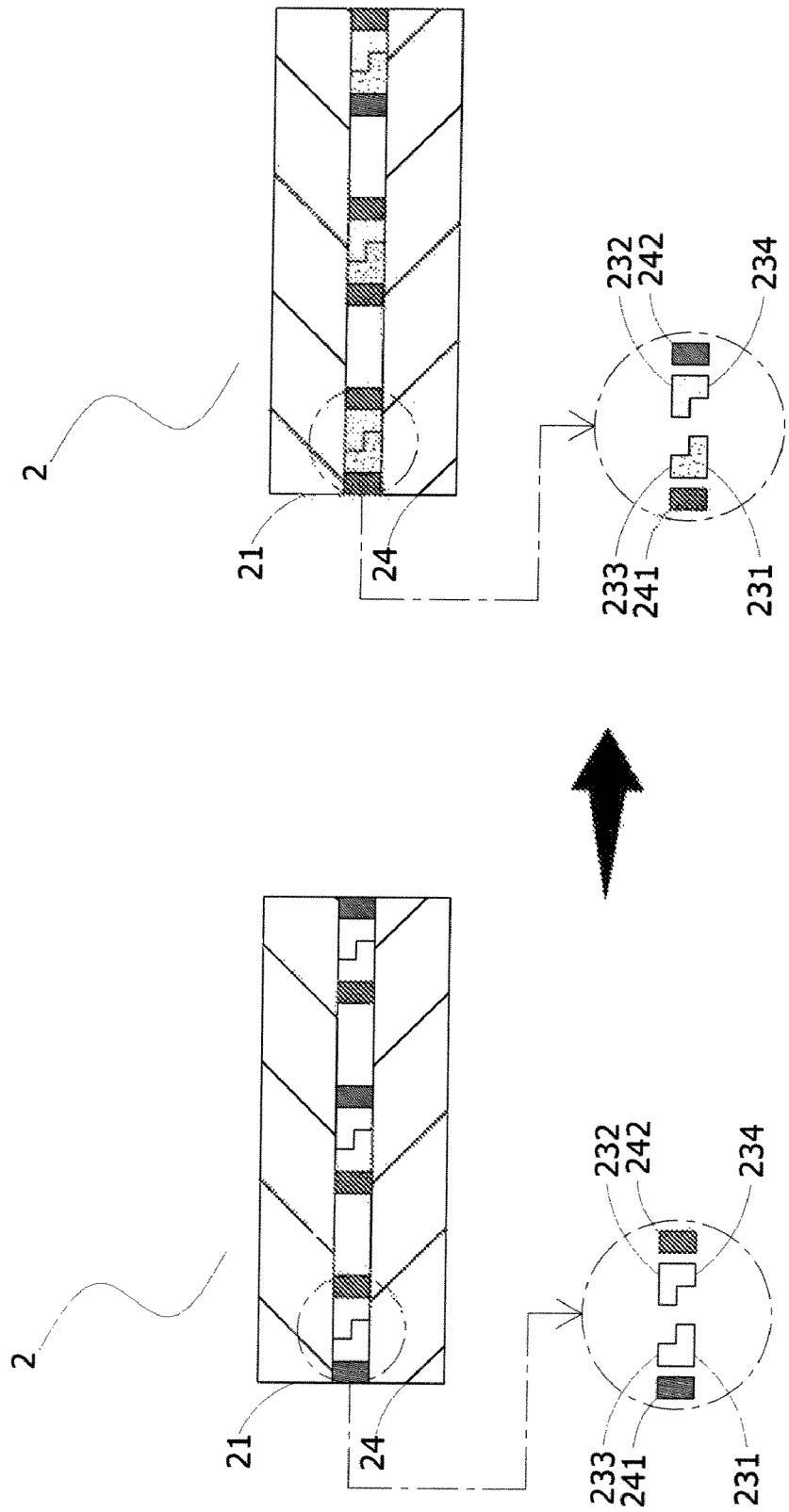
FIG. 23 is a first schematic view, showing an operation of a sixth preferred embodiment of the present invention.
Figure 24:
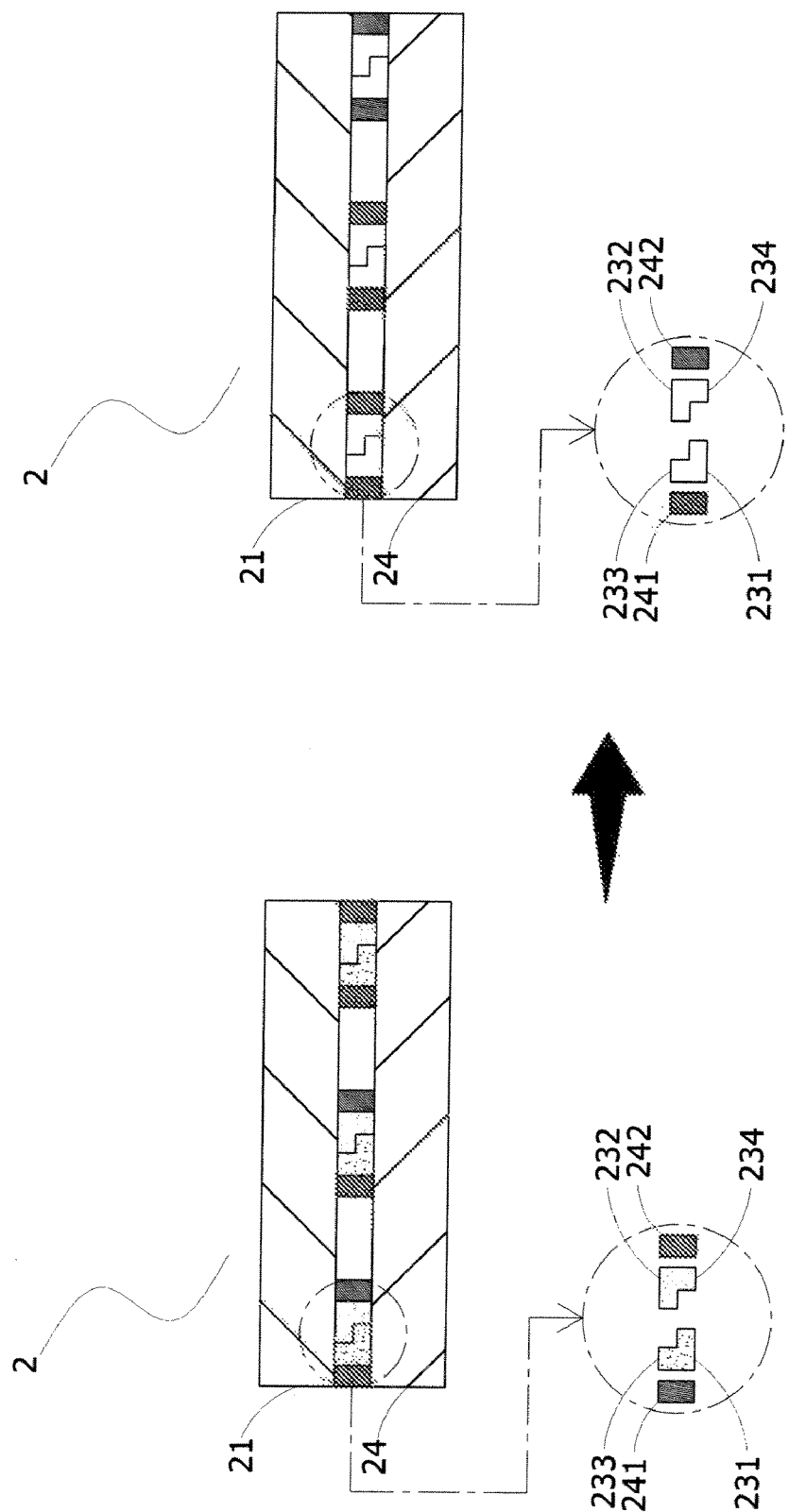
FIG. 24 is a second schematic view, showing the operation of a sixth preferred embodiment of the present invention.

With reference to FIGS. 22 to 24 for an exploded view and schematic views of a sixth preferred embodiment of the present invention, the difference of this preferred embodiment from each of the aforementioned preferred embodiments resides on that an extension 233, 234 is formed separately on surfaces of the first electrochromic layer 231 and the second electrochromic layer 232, such that when the first electrochromic layer 231 and the second electrochromic layer 232 are combined, the contact area can be increased to improve the speed of the electrochromic conversion.

In addition, the first electrochromic layer 231 and the second electrochromic layer 232 are formed between the conducting elements 241, 242 directly. In other words, the first electrochromic layers 231 and the second electrochromic layers 232 are coupled with each other, and the other side of the same horizontal plane on the same side is coupled to the third and fourth conducting elements 241, 242, such that the conducting elements 241, 242 and the electrochromic layers 231, 232 are disposed on the same plane in order to reduce the overall thickness and improve the light output rate effectively.

In FIG. 23, the electrochromic layers 231, 232 are switched from the transparent state to the colored state to produce a dark light shield area. If the bias voltage applied to the electrochromic layers 231, 232 disappears, the electrochromic layers 231, 232 are changed from the colored state to the transparent state, and this is called the anodic coloration method. In FIG. 24, the electrochromic layers 231, 232 change the dark light shield area from the colored state to the transparent state. After the bias voltage applied to the electrochromic layers 231, 232 disappears, the electrochromic layers 231, 232 are changed from the transparent state to the colored state to resume the dark light shield area, and this is called the cathodic coloration method.

Figure 25:
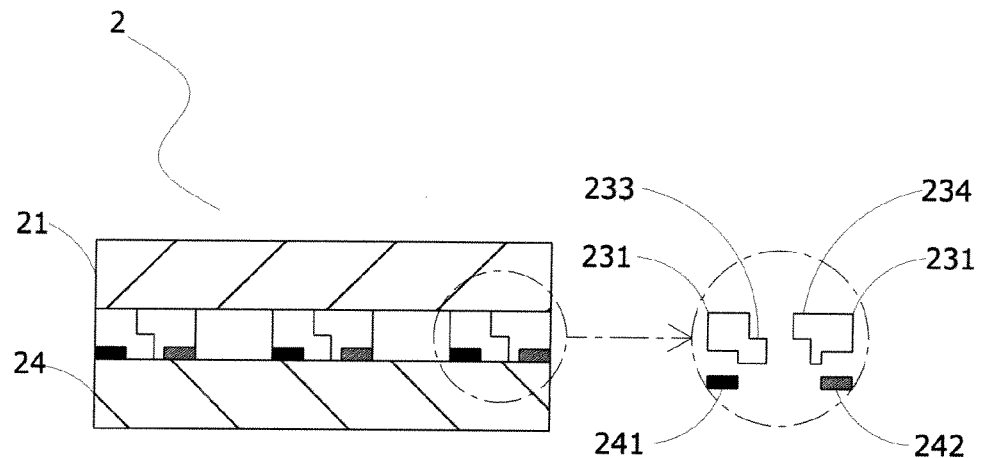
FIG. 25 is a first schematic view, showing a combination of different layers in accordance with a sixth preferred embodiment of the present invention.
Figure 26:
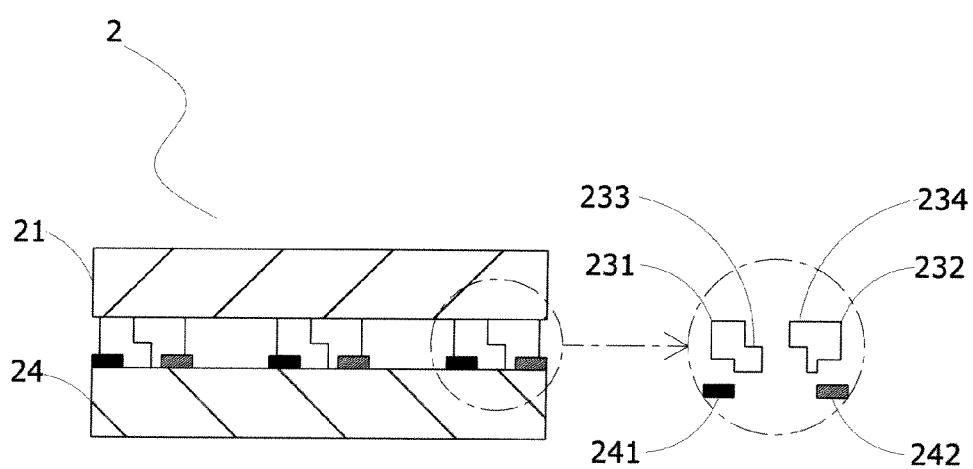
FIG. 26 is a second schematic view, showing the combination of different layers in accordance with a sixth preferred embodiment of the present invention.

With reference to FIGS. 25 and 26 for schematic views showing a combination of different layers in accordance with a sixth preferred embodiment of the present invention, the conducting elements 241, 242 can be disposed on a lower surface of the electrochromic layers 231, 232, such that the first electrochromic layers 231 and the second electrochromic layers 232 are coupled to each other, and the other side has a length equal to or smaller than the conducting elements 241, 242, and the right side of the first electrochromic layers 231 is coupled to the left side of the second electrochromic layers 232, and the length extended from the left side is equal to or smaller than the length of the third conducting element 241. In FIG. 25, and the length extended from the left side of the first electrochromic layers 231 is equal to the length of the third conducting element 241. In FIG. 26, the length extended from the left side of the first electrochromic layers 231 is smaller than the length of the third conducting element 241. It is noteworthy to point out that the left and right sides mentioned above are provided for illustrating the change of length only, but not intended for limiting the left and right installation of the components.

While the invention has been described by means of specific embodiments, numerous modifications and variations could be made thereto by those generally skilled in the art without departing from the scope and spirit of the invention set forth in the claims.

In summation of the description above, the 2D/3D image switching display device of the present invention complies with the patent application requirements, and thus is duly filed for patent application.

What is claimed is:
1. A 2D/3D image switching display device, comprising:
an image display unit, for displaying a planar image and a stereo image;
an image switching unit, coupled to a surface of the image display unit surface, and including:
a first substrate;
a third substrate, including a plurality of third conducting elements and fourth conducting elements alternately arranged with an interval apart from each other on a surface of the first substrate, and another surface of the third substrate being provided for coupling with the image display unit surface; and
an electrochromic unit, installed between the conducting elements, and including a first electrochromic layer and a second electrochromic layer arranged alternately with an interval apart from each other on the same side of the electrochromic unit, and the other side of the first electrochromic layer being provided for coupling with the third conducting element, and the other side of the second electrochromic layer being provided for coupling the fourth conducting element, such that the electrochromic layers produce a color change according to an electric conduction of the conducting elements.

2. The 2D/3D image switching display device of claim 1, wherein the image display unit is one selected from the collection of a liquid crystal display (LCD), a plasma display panel (PDP), a surface conduction electron-emitter display (SED), a field emission display (FED), a vacuum fluorescent display (VFD), an organic light-emitting diode (OLED) or an electronic paper (e-Paper).

3. The 2D/3D image switching display device of claim 1, wherein the first substrate and the third substrate are made of glass or a plastic polymer selected from the collection of resin, polyethylene terephthalate (PET), polycarbonate (PC), polyethylene (PE), polyvinyl chloride (PVC), poly propylene (PP), polystyrene (PS), and polymethylmethacrylate (PMMA) or a mixture of the above.

4. The 2D/3D image switching display device of claim 1, wherein the third conducting element and the fourth conducting element are made of an impurity-doped oxide selected from the collection of indium tin oxide (ITO), indium zinc oxide (IZO), Al-doped ZnO (AZO) and antimony tin oxide (ATO).

5. The 2D/3D image switching display device of claim 1, wherein the third conducting element and the fourth conducting element are made of carbon nanotubes.

6. The 2D/3D image switching display device of claim 1, wherein the third conducting element and the fourth conducting element are grids arranged alternately with an interval apart from each other.

7. The 2D/3D image switching display device of claim 1, wherein the first electrochromic layer and second electrochromic layer surface have extensions for increasing a contact area, and the extensions are correspondingly engaged with one another.

8. The 2D/3D image switching display device of claim 1, wherein the first electrochromic layer and second electrochromic layer are connected at a position that is extended between the conducting elements to contact with the third substrate.

9. The 2D/3D image switching display device of claim 1, wherein the first electrochromic layer is made of an anodic coloration transition metal oxide selected from the collection of chromium oxide ($Cr_2O_3$), nickel oxide ($NiO_x$), iridium oxide ($IrO_2$), manganese oxide ($MnO_2$), nickel hydroxide $Ni(OH)_2$, tantalum pentoxide ($Ta_2O_5$) and ferric ferrocyanide $Fe_4[Fe(CN)_6]_3$, and the second electrochromic layer is made of a cathodic coloration transition metal oxide selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$) and tantalum pentoxide ($Ta_2O_5$).

10. The 2D/3D image switching display device of claim 1, wherein the second electrochromic layer is made of an anodic coloration transition metal oxide selected from the collection of chromium oxide ($Cr_2O_3$), nickel oxide ($NiO_x$), iridium oxide ($IrO_2$), manganese oxide ($MnO_2$), nickel hydroxide $Ni(OH)_2$, tantalum pentoxide ($Ta_2O_5$) and ferric ferrocyanide $Fe_4[Fe(CN)_6]_3$, and the first electrochromic layer is made of a cathodic coloration transition metal oxide selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$) and tantalum pentoxide ($Ta_2O_5$).

11. The 2D/3D image switching display device of claim 1, wherein the first electrochromic layer and the second electrochromic layer are made of a cathodic/anodic coloration transition metal oxide selected from the collection of vanadium oxide ($V_2O_2$), rhodium oxide ($Rh_2O_3$) and cobalt oxide ($CoO_x$).

12. The 2D/3D image switching display device of claim 1, further comprising an isolating unit installed between the electrochromic layers.

13. The 2D/3D image switching display device of claim 12, wherein the isolating unit is a photoresist.

* * * * *